April 12, 1966     D. W. PETERS     3,245,265

CHARGE DIFFUSION PRESSURE TRANSDUCER

Filed July 8, 1964

INVENTOR.
DAN W. PETERS
BY Samuel Lindenberg
ATTORNEY

United States Patent Office

3,245,265
Patented Apr. 12, 1966

3,245,265
CHARGE DIFFUSION PRESSURE TRANSDUCER
Dan W. Peters, Mountain View, Calif., assignor to Stanford Research Institute, Menlo Park, Calif., a corporation of California
Filed July 8, 1964, Ser. No. 381,167
10 Claims. (Cl. 73—398)

This invention relates to pressure transducers of the type used for measuring gas pressures and more particularly to improvements therein.

It is an object of this invention to provide a novel gas pressure measuring device.

Still another object of this invention is the provision of a unique structure for a differential pressure gauge.

Yet another object of the present invention is the provision of a simple and useful apparatus for measuring gas pressures. Yet another object of the present invention is the provision of a differential gas pressure measuring device which operates along novel principles.

These and other objects of the present invention may be achieved in an arrangement consisting of a disc of an appropriate material whose two opposite surfaces are exposed to different concentrations of the anion of which the material is composed. A chemical reaction occurs between the gas and the material at each surface creating atomic defects within the material. The number of defects created depends upon the gas concentration at the surface in question. There thus results a concentration gradient of defects across the material. If the two material surfaces face unequal gas pressures, this permits internal charges, ions and/or electrons, to diffuse through the material. A voltage $V_0$ is developed across the material due to this charge diffusion which is a function of the gas pressures at the material surfaces. This voltage may then be measured to indicate gas pressure.

Figure 1:
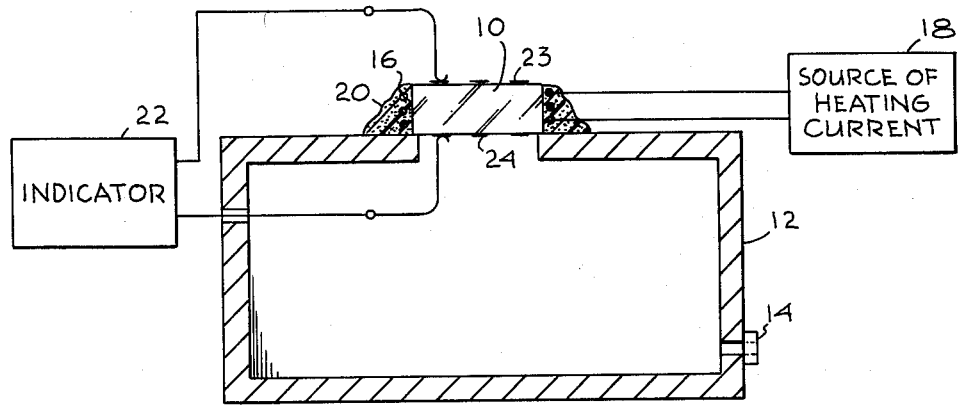
Figure 2:
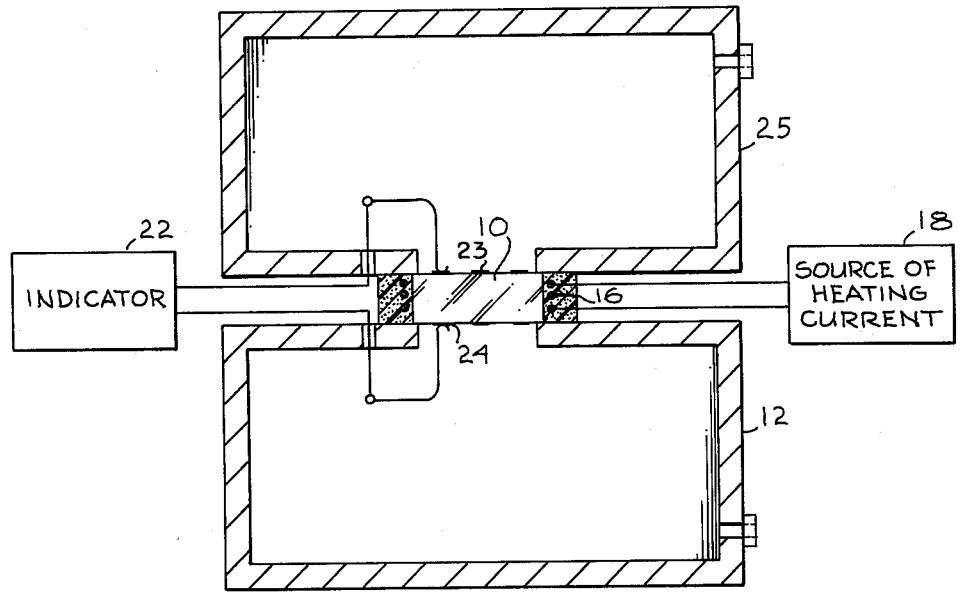

The novel features that are considered characteristic of this invention are set forth with particularity in the appended claims. The invention itself both as to its organization and method of operation, as well as additional objects and advantages thereof, will best be understood when read in connection with the accompanying drawings, in which:

FIGURE 1 is a schematic diagram of a one-chamber embodiment of the invention, and FIGURE 2 is a schematic diagram of a two-chamber embodiment of the invention.

Referring now to FIGURE 1, there may be seen a schematic drawing of an embodiment of the invention. This comprises either a single crystal or a poly-crystal of a material 10 having the property such that a reaction can occur between the gas to which the crystal is exposed at each of its surfaces which creates atomic defects within the crystal. The number of defects created should depend upon the gas concentration at the surface in question. An example of materials which are suitable comprises magnesium oxide which can be used as a detector of oxygen pressures since its anion is oxygen. Boron nitride can be used for determining nitrogen pressures since its anion is nitrogen. Sodium chloride may be used for detecting chlorine pressures since its anion is chlorine. Cadmium sulfide may be used for detecting sulphur vapor pressures since its anion is sulphur.

Such single crystal or poly-crystal is mounted sealed to the opening in an enclosed chamber 12. The chamber wall will have an opening 14 with a suitable valve therein whereby the gas to be measured may be admitted to the chamber at a known constant pressure. If desired, the surface of the crystal which is outside of the chamber may be exposed to a known constant pressure such as that of the atmosphere and the gas whose pressure is measured may be introduced into the chamber. The device may be operated in a completely reversible fashion.

Surrounding the crystal 10 are heating wires 16 which are connected to a source of heating current 18. The crystal and the heating wires are held fixedly in place over the opening in the chamber 12 by any suitable cement 20. A suitable indicator 22 such as an electrostatic volt meter, is connected to the opposite surfaces of the crystal wheeron a contact grid respectively 22, 24 may be painted by means of silver paint.

The temperature of the crystal is maintained constant in order to maintain consistency in readings between temperature measurements. As previously indicated, the number of atomic defects which occur at the surfaces of the crystal which are exposed depends upon the gas concentration at the surface. The function of the cement which is employed is to insure that only the two opposite surfaces which are respectively exposed to the known and the unknown gas pressures, are exposed. A concentration gradient of defects occurs across the crystal when the two crystal surfaces face unequal gas pressures, which permits internal charges, ions and/or electrons to diffuse through the crystal. A voltage $V_0$ is developed across the crystal, due to this charge diffusion, which is a function of the gas pressures at the crystal surfaces. The voltage $V_0$ may be expressed as $$V_0 = AT \log \left(\frac{P_2}{P_1}\right)$$

where A is a material constant, T is the crystal temperature and $$\frac{P_2}{P_1}$$

is the ratio of the pressures at the two surfaces of crystal. The voltage $V_0$ is measured and calibrated in terms of the gas pressure on one side of the crystal. The structure may readily be calibrated using known gas pressures for such purpose. In order to exemplify the operation of the invention, and not to be construed as a limitation thereon, an embodiment of the invention was built using a magnesium oxide crystal, for the purpose of measuring oxygen pressures. An electrometer having an input impedance on the order of $10^{12}$ ohms was used to measure the voltage across the crystal. Nichrome wire was used as the heating wire which was wrapped around the crystal and a heating current of 0.5 amperes was applied to this nichrome wire. One surface of the crystal was exposed to atmospheric pressure and oxygen was introduced into the chamber at pressures which varied over a range of pressures between $10^3$ millimeters of mercury down to almost $10^{-2}$ millimeters of mercury. The voltage that was read varied linearly from 0.25 volt up to 0.84 volt, as the pressure was decreased, down to $10^{-1.8}$, at which point there was a slight departure from linearity in response when plotted on a semi-logarithmic scale. However, over the region of response indicated, such response was linear and completely reversible. Temperatures should be carefully controlled and should not exceed a predetermined value as determined by the type of material employed in order to insure complete reversibility and consistency of reading. These factors can easily be determined by a calibration run.

FIGURE 2 shows an arrangement of the embodiment of the invention for measuring unknown gas pressures where it is not desired to expose the one surface of the crystal to the atmosphere. Apparatus shown in FIGURE 2 which is identical to that shown in FIGURE 1 bears the same reference numerals. The addition to FIGURE 1 which is shown in FIGURE 2 comprises another container 24 which has an opening therein into which the upper surface of the crystal 10 is sealed. One of the containers 12, 24 will have gas introduced thereinto at a known pressure and the other of the containers will have gas introduced thereinto at an unknown pressure. The indicator 22 will indicate the amplitude of such unknown pressure. Alternatively, the arrangement shown in FIGURE 1 may have its upper wall sealed to any container of gas whose pressure it is desired to continuously monitor. Such sealing may be done in any well known manner.

There has been described and shown herein a novel, useful and simple gas pressure measuring device.

What is claimed is:

1. Apparatus for measuring the unknown pressure of a gas comprising a source of said gas at a known pressure, a material whose anion is that of said gas having two opposite surfaces, one of said surfaces being exposed to said gas at said known pressure and the opposite surface being exposed to said gas at said unknown pressure, and means for measuring the voltage difference established at the two opposite surfaces of said material in response to the difference in said gas pressures to which it is exposed.

2. Apparatus for measuring the unknown pressure of a gas as recited in claim 1 wherein there is included means for maintaining said material at a constant temperature.

3. Apparatus for measuring the unknown pressure of a gas comprising a material having an anion which is that of said gas, said material having two opposed surfaces, one of its said surfaces being exposed to said gas whose pressure it is sought to be measured, means for exposing the opposite surface of said crystal to said gas at a known pressure, means for maintaining said material temperature constant, and indicator means for measuring the voltage difference across said two opposite surfaces.

4. Apparatus as recited in claim 3 wherein said material is magnesium oxide.

5. Apparatus as recited in claim 3 wherein said material is boron nitride.

6. Apparatus as recited in claim 3 wherein said material is sodium chloride.

7. Apparatus as recited in claim 3 wherein said material is cadmium sulphide.

8. Apparatus for measuring gas at an unknown pressure comprising a first and second vessel having an opening therebetween, said gas at said unknown pressure being contained in said first vessel, said gas at a known pressure filling said second vessel, a material whose anion is that of said gas supported within said opening and having one surface exposed to said gas at said known pressure and the opposite surface exposed to said gas at said unknown pressure, means for heating said materials, and indicator means connected to said opposite surfaces of material for measuring the voltage developed thereacross.

9. In apparatus for measuring the differential pressure between two identical gases, the improvement comprising a material whose anion is that of said gases, said material having two opposite faces which are respectively exposed to said two gases at said differential pressures, and means for measuring the difference in voltage at said two opposite faces developed in response to said differential gas pressure.

10. In aparatus for measuring the differential pressure between two identical gases, the improvement comprising a material having two opposed surfaces which are respectively exposed to said two gases at said differential pressures, said material having the property that a voltage $V_0$ is developed thereacross which equals $AT \log (P_2/P_1)$, where A is a constant of said material, T is the temperature of said material, and $P_2/P_1$ is the ratio of the pressures at the two surfaces of said crystal, and means for measuring said voltage $V_0$.

No references cited.

LOUIS R. PRINCE, *Primary Examiner.*